: US 7,562,463 B2
(45) Date of Patent: Jul. 21, 2009

(12) United States Patent
Vaes

(54) COMBINATION LEVEL AND SQUARE

(76) Inventor: Ed Vaes, 223 Avondale Street, Hamilton, ON (CA) L8L 7C4

( * ) Notice: Subject to any disclaimer, the term of this patent is extended or adjusted under 35 U.S.C. 154(b) by 0 days.

(21) Appl. No.: 11/822,323

(22) Filed: Jul. 5, 2007

(65) Prior Publication Data

US 2007/0266576 A1 Nov. 22, 2007

Related U.S. Application Data

(63) Continuation of application No. PCT/CA2006/000097, filed on Jan. 26, 2006.

(60) Provisional application No. 60/647,418, filed on Jan. 28, 2005.

(51) Int. Cl.
*G01C 9/26* (2006.01)

(52) U.S. Cl. .............. 33/374; 33/376; 33/451
(58) Field of Classification Search ............ 33/374, 33/376, 365, 451, 452, 483, 484, 485, 491, 33/354, 347, 351, 353, 375, 377, 379, 429, 33/437, 474, 478, 479, 482; 403/381, 331–333, 403/336; D10/69; 446/69, 71, 75–77, 85, 446/106, 108, 114, 115, 122, 124, 127
See application file for complete search history.

(56) References Cited

U.S. PATENT DOCUMENTS

| 481,637 | A | * | 8/1892 | Poole | 33/478 |
| 636,191 | A | * | 10/1899 | Wright | 33/353 |
| 691,063 | A | * | 1/1902 | Lesh | 33/374 |
| 846,248 | A | * | 3/1907 | Schmalz | 33/478 |
| 1,182,730 | A | * | 5/1916 | Anderson et al. | 33/376 |
| 1,473,877 | A | * | 11/1923 | Rome | 33/350 |
| 1,489,239 | A | * | 4/1924 | Eagan | 33/343 |
| 1,670,432 | A | * | 5/1928 | Baldon | 403/102 |
| 1,919,551 | A | * | 7/1933 | Griffin | 33/478 |
| 2,551,524 | A | * | 5/1951 | Bullivant | 33/374 |
| 3,635,396 | A | * | 1/1972 | Palfi | 235/70 R |
| 4,060,902 | A | * | 12/1977 | Keller | 33/403 |
| 5,353,509 | A | * | 10/1994 | Black | 33/451 |
| 5,433,011 | A | * | 7/1995 | Scarborough et al. | 33/376 |
| 5,839,201 | A | * | 11/1998 | Young | 33/451 |
| 6,560,885 | B1 | * | 5/2003 | Cosentino | 33/374 |
| 6,807,743 | B2 | * | 10/2004 | Odachowski | 33/465 |
| 7,047,655 | B2 | * | 5/2006 | Larsson | 33/471 |
| 2002/0121025 | A1 | * | 9/2002 | Leite | 33/374 |

* cited by examiner

*Primary Examiner*—Amy Cohen Johnson

(57) ABSTRACT

A combination level and square includes a straight generally rectangular first level including a number of attachment elements and a cavity defined therein. It further includes a straight generally rectangular second level including a number of attachment elements adapted to cooperatively engage with the attachment elements of the first level, such that the first level cavity is dimensioned to releasably receive the second level therein, such that the level can be placed in nested position. Preferably the attachment elements are so arranged that the two levels can further be placed in a long position, a square position, a t-square position and an angled position.

8 Claims, 13 Drawing Sheets

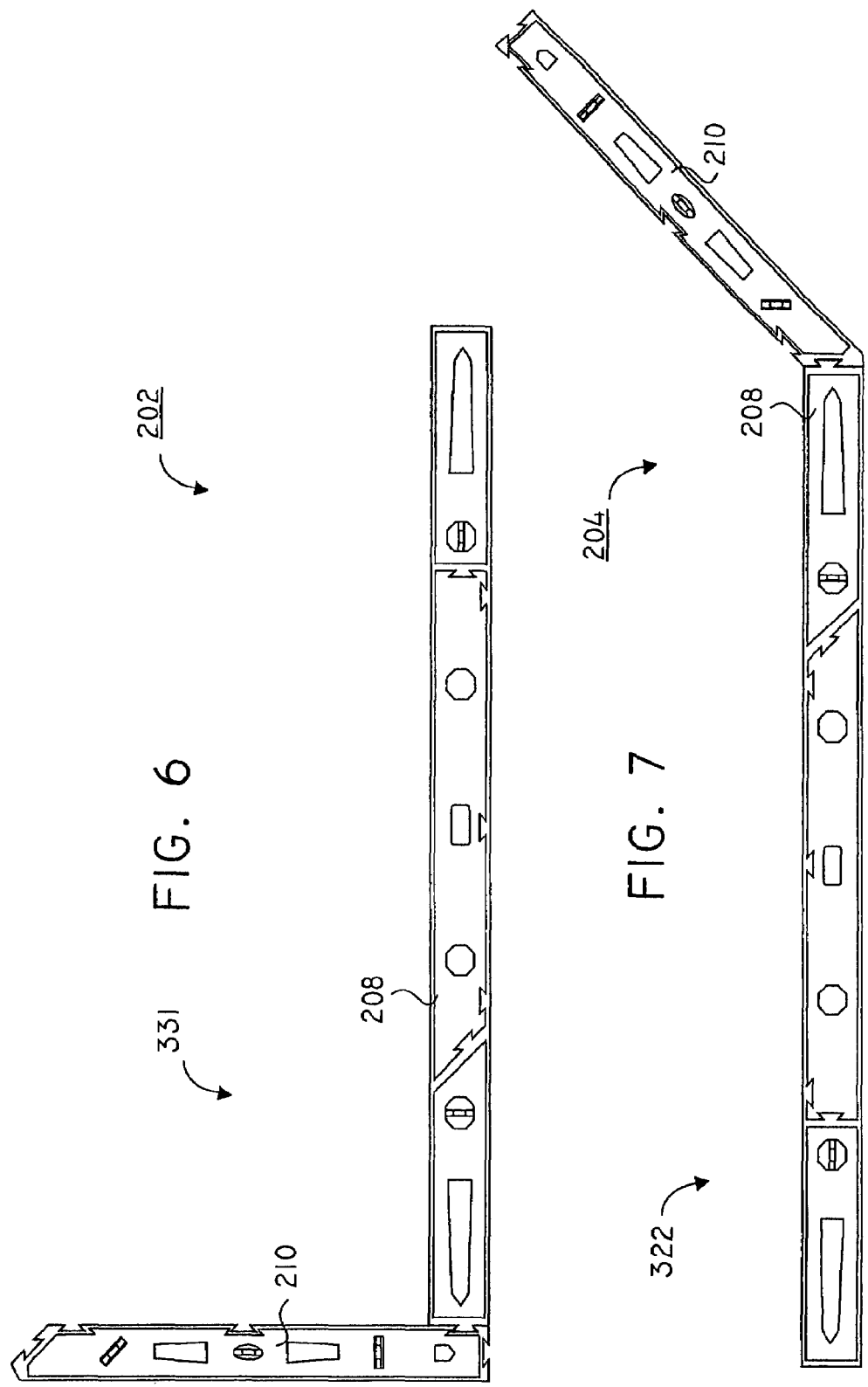

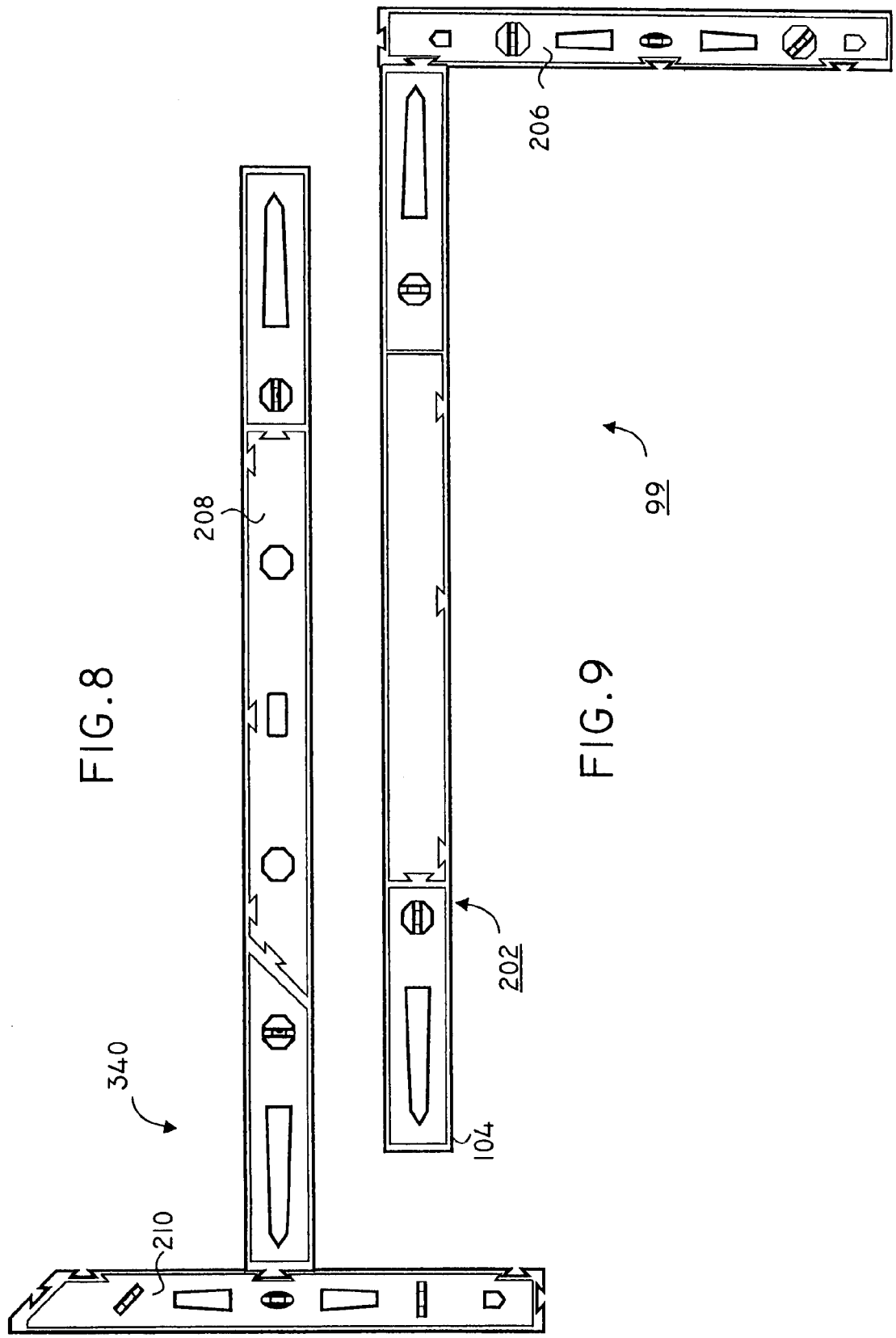

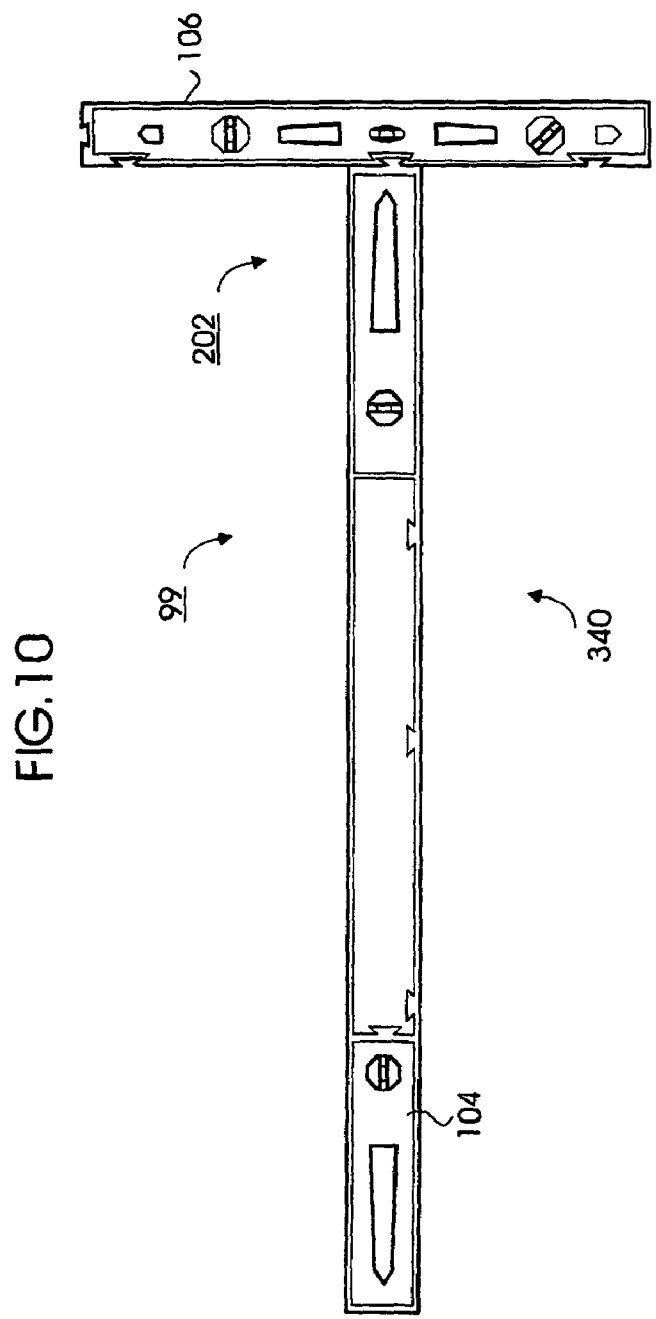

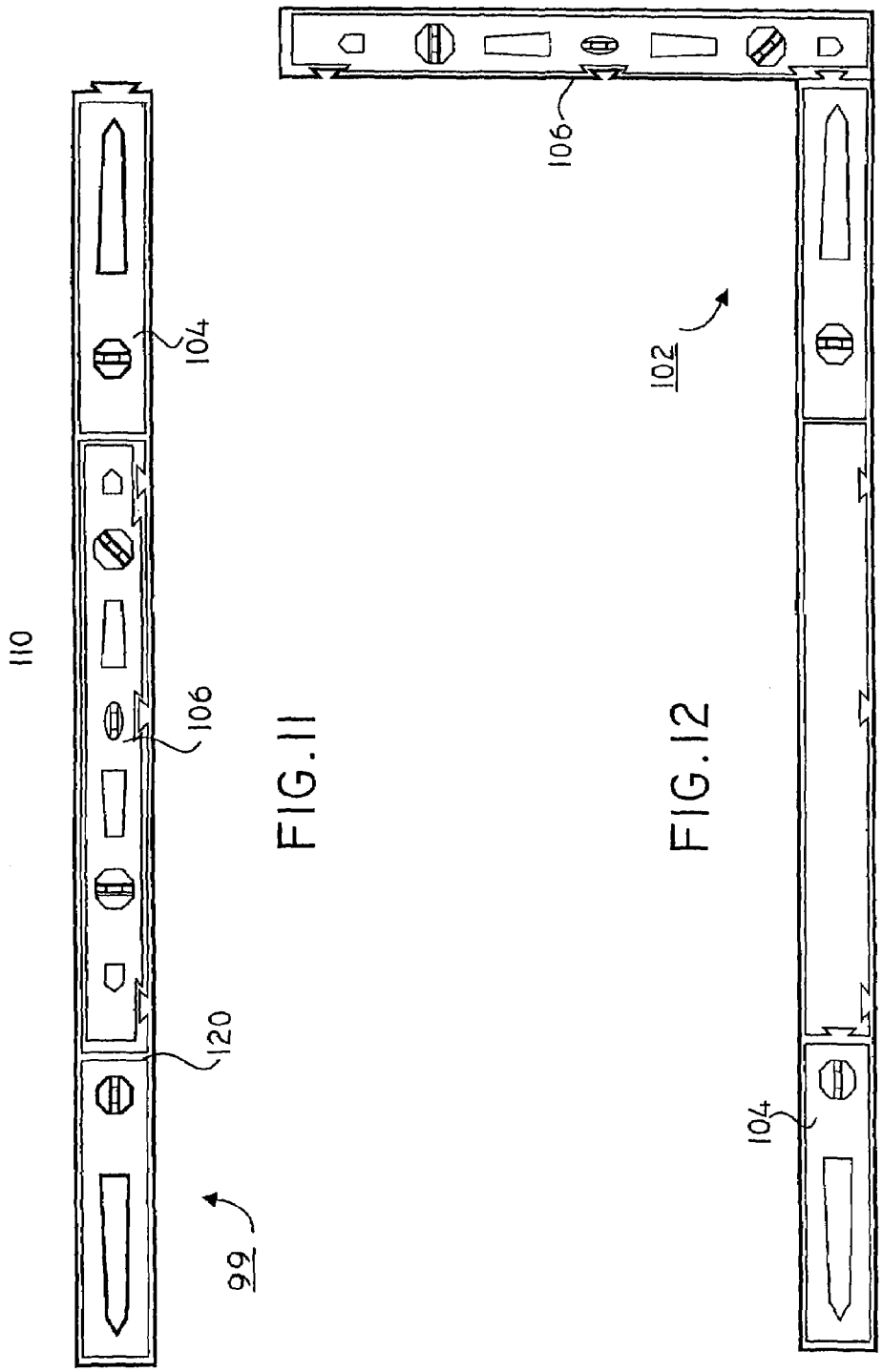

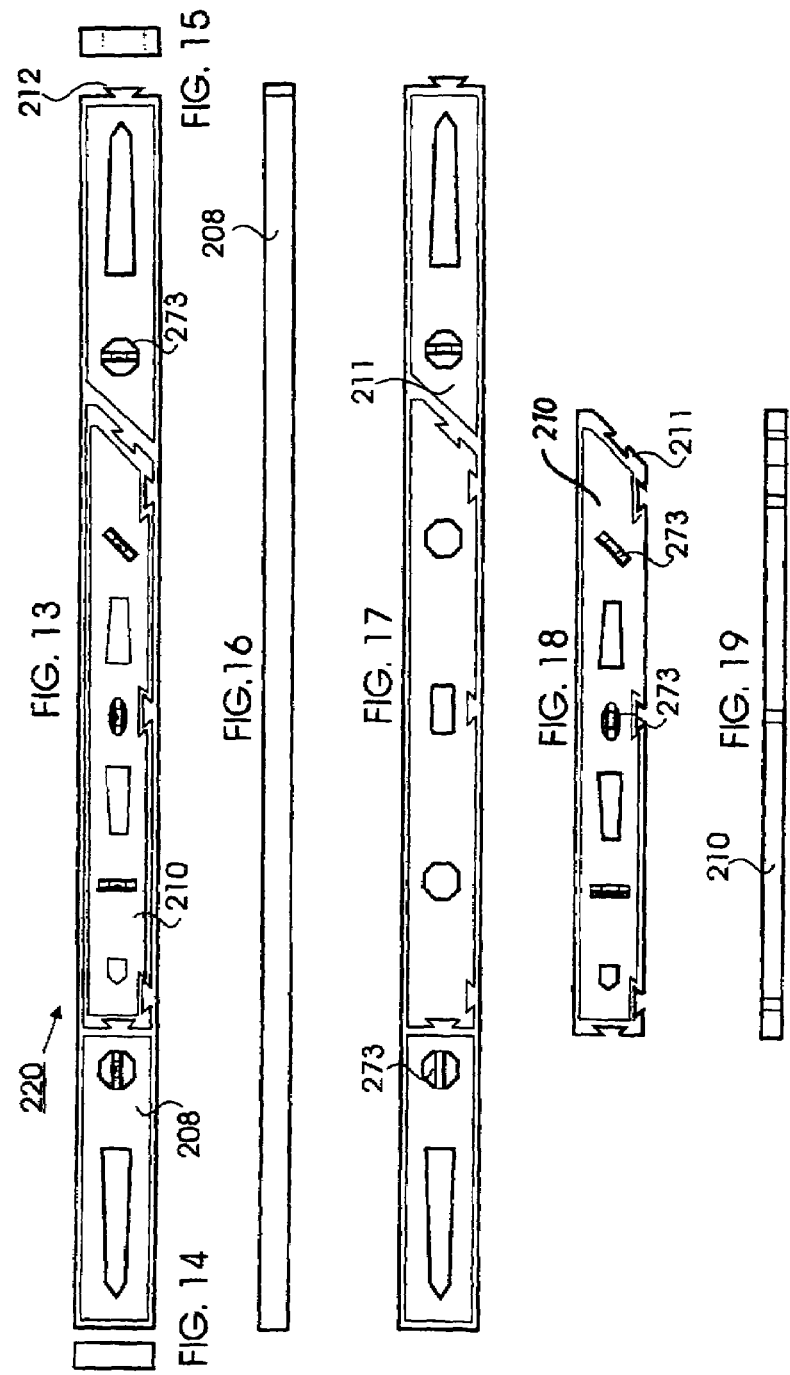

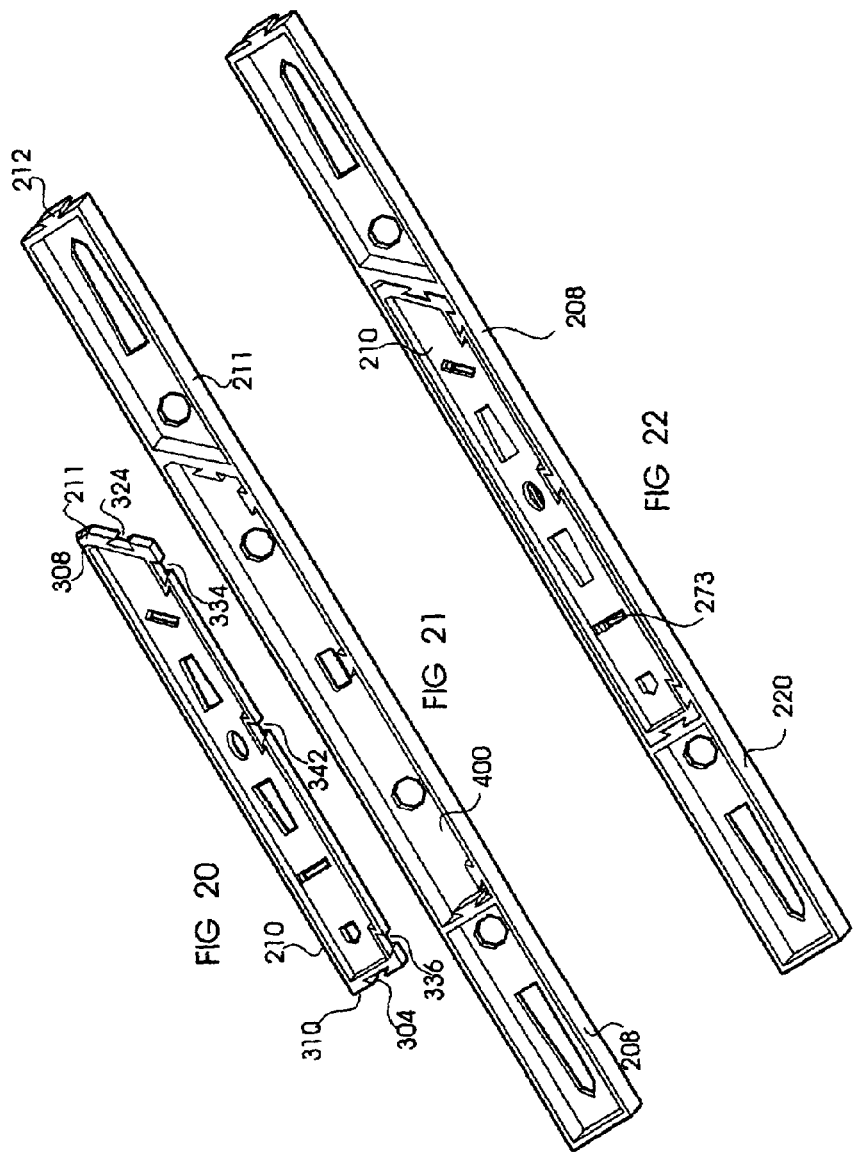

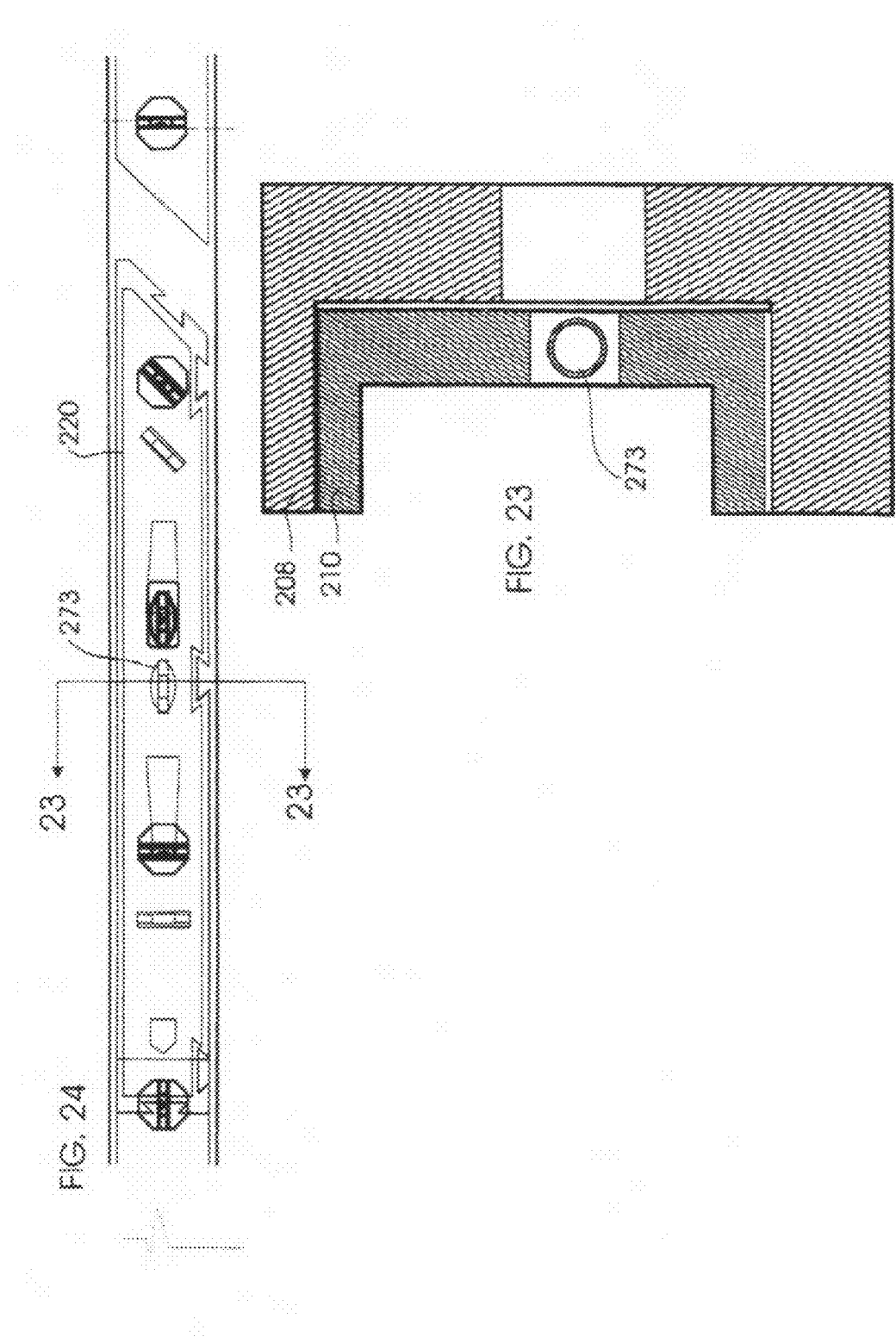

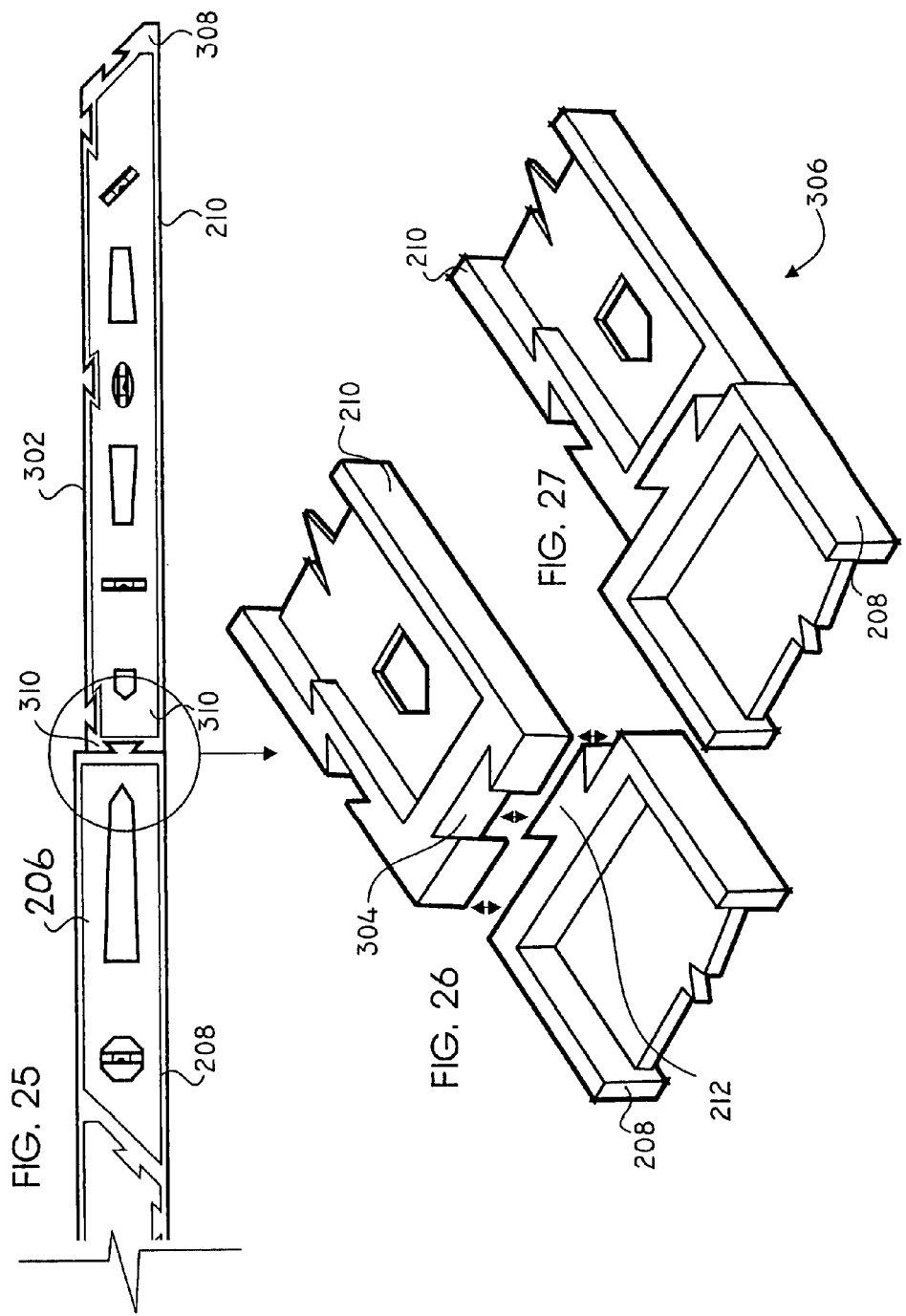

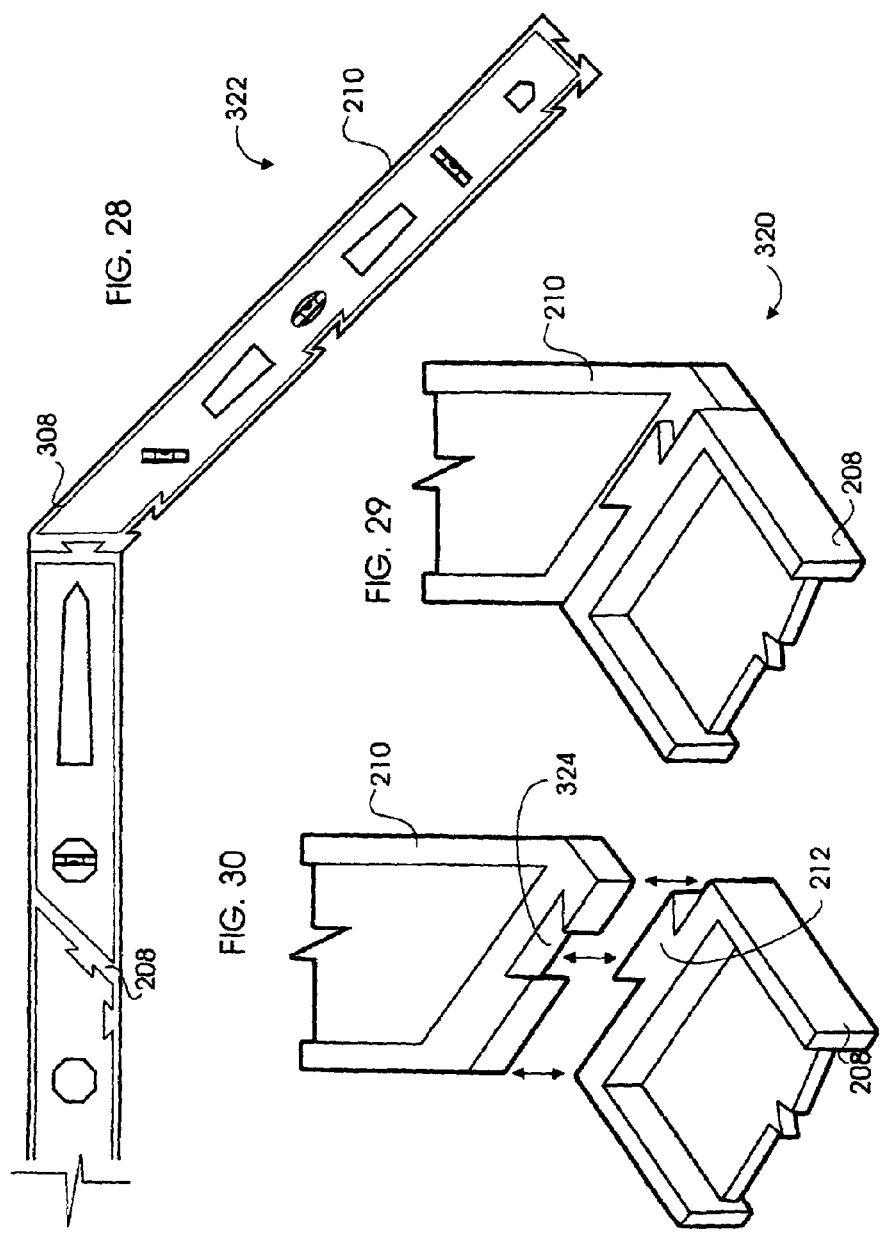

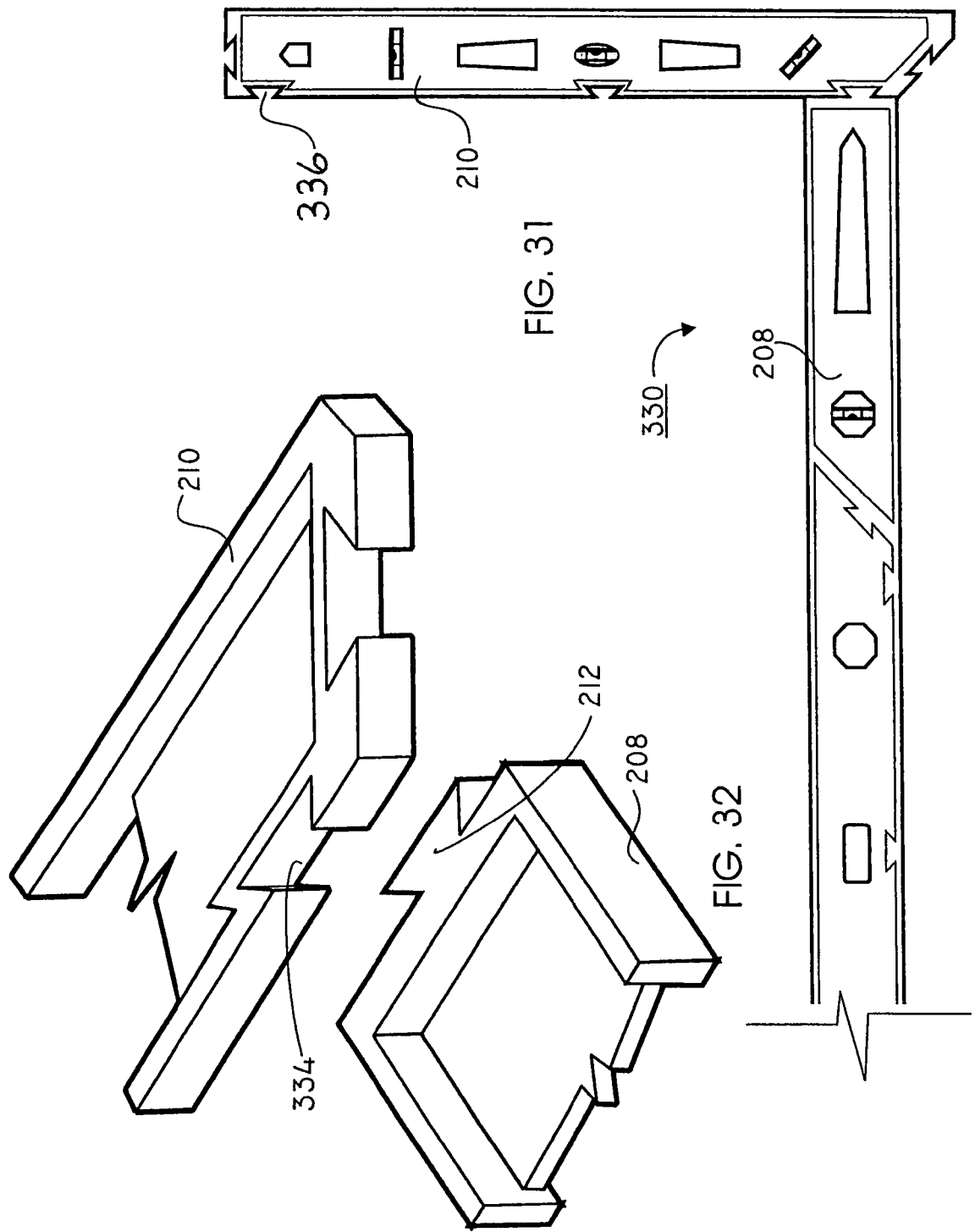

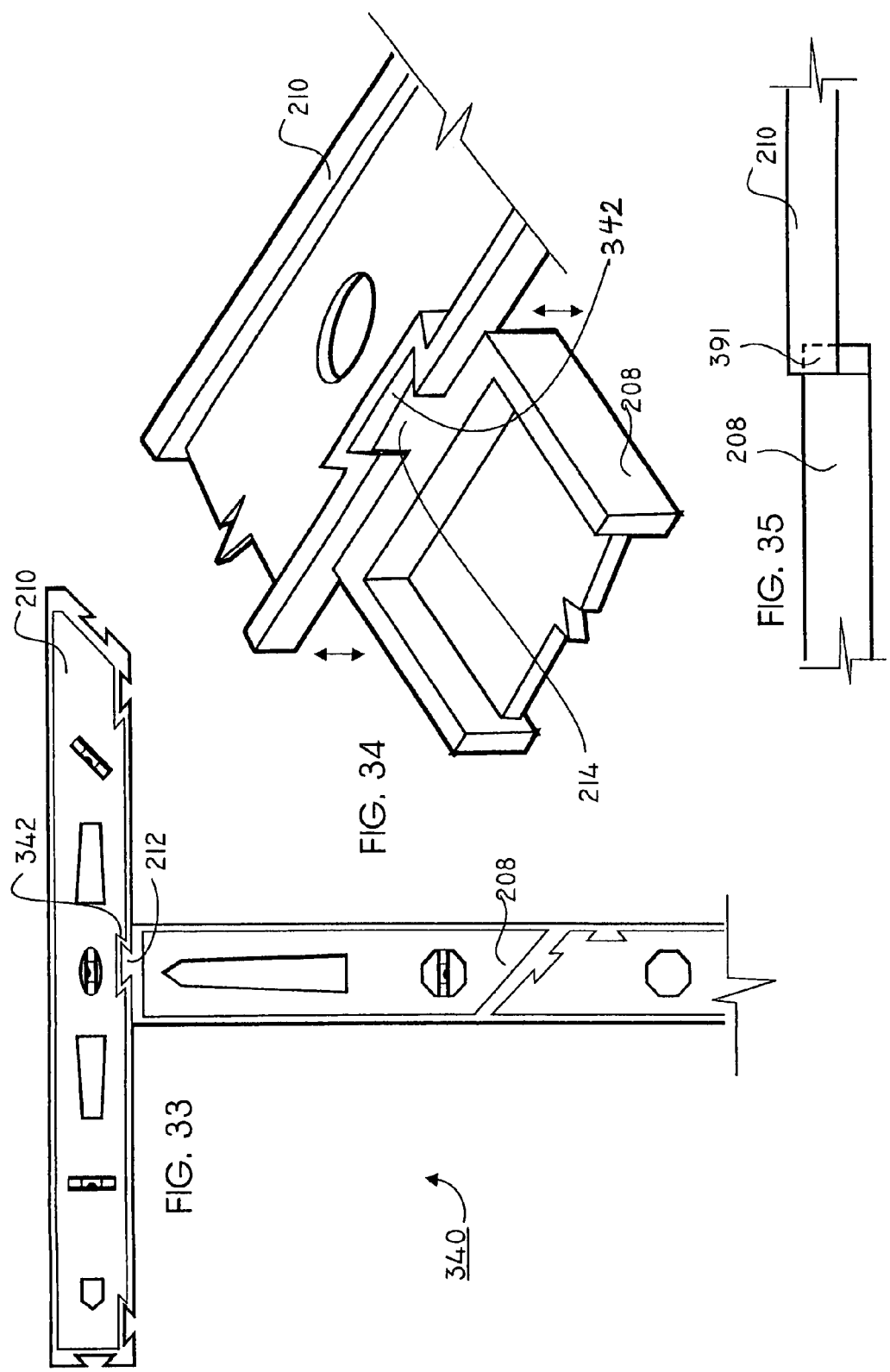

COMBINATION LEVEL AND SQUARE

This application is a continuation of the International Application PCT/CA2006/000097 filed on Jan. 26, 2006 by Ed Vaes titled COMBINATION LEVEL AND SQUARE which designated the United States as a National Country. The PCT Application claims priority from previously filed U.S. Provisional application 60/647,418 filed Jan. 28, 2005.

FIELD OF THE INVENTION

The present invention relates to levels and square used in the construction industry and more particularly relates to a combination level and square tool.

SUMMARY OF THE INVENTION

The present invention a combination level and square comprises
- (a) a straight generally rectangular first level including a number of attachment elements and a cavity defined therein;
- (b) a straight generally rectangular second level including a number of attachment elements adapted to cooperatively engage with the attachment elements of the first level such that the first level cavity dimensioned and adapted to releasably receive the second level therein such that the levels are in a nested position.

Preferably wherein one attachment element of the first level engaging with one attachment element of the second level thereby connecting the levels end to end placing the levels in a long position forming an extra long level such that the overall length of the extra long level being equal to the sum of the lengths of the first and second level.

Preferably wherein the attachment element of the first level being a male dovetail located at an attachment end of the first level and the attachment element of the second level being a cooperating square end female dovetail located at a square end of the second level.

Preferably wherein one attachment element of the first level engaging with attachment elements of the second level thereby connecting the levels into a square position forming a carpenter square.

Preferably wherein the attachment element of the first level being a male dovetail located at an attachment end of the first level and the attachment elements of the second level being cooperating female dovetails selected from the group including first square female dovetail and second square female dovetail thereby placing the levels in a first square position and second square position respectively.

Preferably wherein one attachment element of the first level engaging with one attachment element of the second level releasably connecting the first level and second level in a T-square position thereby forming a T-square.

Preferably wherein the attachment element of the first level being a male dovetail located at an attachment end of the first level and the attachment element of the second level being a cooperating T female dovetail located such that attachment location of the T female dovetail attachment element is at a point which substantially bisects the second level.

Preferably, wherein one attachment element of the first level engaging with one attachment element of the second level thereby releasably connecting the first and second level into an angled position thereby forming an angled level.

Preferably wherein the attachment element of the first level being a male dovetail located at an attachment end of the first level and the attachment element of the second level being a cooperating angled female dovetail located at an angled end of the second level.

The present invention a combination level and square also includes:
- (a) a straight generally rectangular first level;
- (b) a straight generally rectangular second level;
- (c) wherein the first level including a cavity dimensioned and adapted to releasably receive the second level therein placing the levels in a nested position, such that the exterior dimensions of the first level are the same in the nested position and in a separate position.

Preferably further including a first means for releasably connecting the levels end to end placing the levels in a long position forming an extra long level such that the overall length of the extra long level being equal to the sum of the lengths of the first and second level.

Preferably further including a second means for releasably connecting the levels into a square position forming a carpenter square.

Preferably further including a third means for releasably connecting the first level and second level into a T-square position thereby forming a T-square.

Preferably further including a fourth means for releasably connecting the first and second level into an angled position thereby forming an angled level.

The present invention a combination level and square also includes:
- (a) a straight generally rectangular first level;
- (b) a straight generally rectangular second level;
- (c) wherein the first level including a cavity dimensioned and adapted to releasably receive the second level therein placing the levels in a nested position;
- (d) wherein the first and second level including means for releasably attaching the first level to the second level selectively placing the levels in a long position, square position, T square position, and angled position.

BRIEF DESCRIPTION OF THE DRAWINGS

The invention will now be described by way of example only with reference to the following drawings in which:

FIG. 6 is a top plan view of the first level and second level connected together as a carpenters square.

FIG. 7 is a top plan view of the first level and second level shown as a 45° level.

FIG. 8 shows the first level connected to the second level to create a T-square.

FIG. 9 is an alternate embodiment of the present invention, a combination level and square showing the first level connected to the second level to form a carpenters square.

FIG. 10 is a top plan view of the first level connected to the second level to form a T-square.

FIG. 11 is a top plan view of the second level nested securely within the first level.

FIG. 12 is a top plan view of the first level connected to the second level to form a carpenter square.

FIG. 13 is a top plan view of the second level nested securely within the first level in the nested position.

FIG. 14 is a left end view of the first level.

FIG. 15 is a right end view of the first level.

FIG. 16 is a side elevational view of the first level shown in the nested position 220 with second level nested securely within the first level.

FIG. 17 is a top plan view of the first level shown in the separate position.

FIG. 18 is a top plan view of the second level shown in a separate position.

FIG. 19 is a side elevational view of the second level.

FIG. 20 is a top perspective view of the second level in the separate position.

FIG. 21 is a top perspective view of the first level in the separate position.

FIG. 22 is a top perspective view of the second level nested securely within the first level in the nested position.

FIG. 23 is a cross sectional view taken along lines 23-23 of FIG. 24 showing second level nested securely within first level.

FIG. 24 is a partial cut away view of the first level nested securely within the second level in the nested position.

FIG. 25 is a partial cut away view of the first level connected to the second level in a long position.

FIG. 26 is a partial cut away top perspective view of the first level and second level dove tail connection system.

FIG. 27 is a partial cut away top perspective view of the first level and the second level shown in a long engaged position.

FIG. 28 is a partial cut away top plan view of the first level shown connected to the second level in an angled position.

FIG. 29 is a partial cut away top perspective view of the first level and the second level in an angled engaged position.

FIG. 30 is a partial cut away top perspective view of the first level and the second level showing the angled female dove tail.

FIG. 31 is a partial cut away top plan view of the first level connected together with the second level in a first square position.

FIG. 32 is a partial cut away top perspective view of the first level and the second level showing the male dove tail and the first square female dove tail connection.

FIG. 33 is a partial cut away top plan view of the first level connected together with the second level in a T-square position.

FIG. 34 is a partial cut away top perspective view of the first level together with the second level showing the male dove tail and T-female dove tail connections.

FIG. 35 is a partial side elevational view of the first level connected together to the second level in the T-square position.

DETAILED DESCRIPTION OF THE PREFERRED EMBODIMENT

The present invention a combination level and square shown generally as 99 includes two major components, namely first level 104, and also denoted as 208 connected together with second level 106 also shown as 210. The first embodiment of the invention is depicted in FIGS. 1 through 8, showing first level 208 and second level 210, wherein second level 210 is nested within first level 208 shown in FIG. 4.

Similarly the second embodiment of the present invention, a combination level and square shown generally as 99 is shown in FIGS. 9 through 12, in which first level 104 can be connected together with second level 106 in various combinations as depicted in FIGS. 9, 10, 11 and 12.

Figure 1:
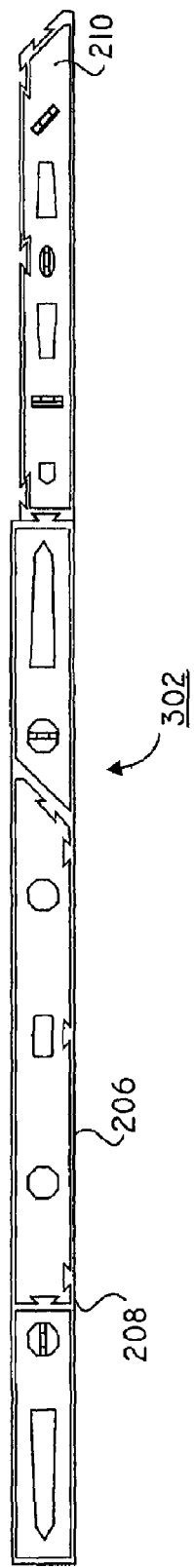
FIG. 1 top plan view of the present invention shown as an extra long level.

First of all, looking at the first embodiment of the present invention shown in FIGS. 1 through 8, first level 208 can be connected to second level 210 in a number of different configurations. In FIG. 1 for example, first level 208 is connected longitudinally end to end to create extra long level 206.

Figure 2:
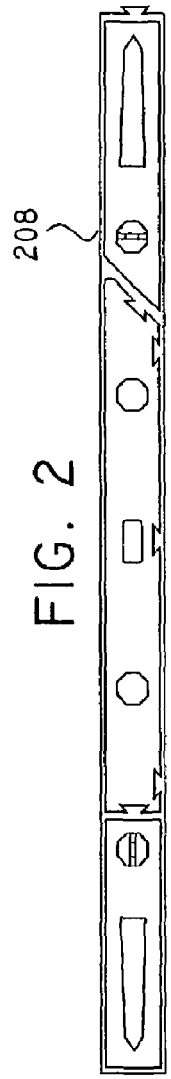
FIG. 2 top plan view of the first level.
Figure 3:
FIG. 3 is a top plan view of the second level.
Figure 4:
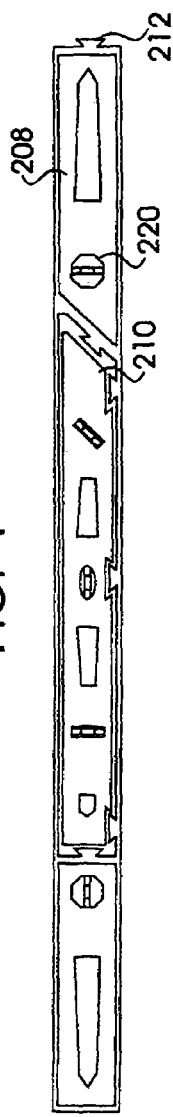
FIG. 4 is a top plan view of the second level nested securely within the first level.

FIG. 2 shows first level 208 in isolation, FIG. 3 shows second level 210 in isolation and FIG. 4 shows second level 210 nested within the first level 208, wherein first level 210 fits snugly within the body of level 208 by using a depicted dove tail notches which frictionally holds second level 210 in place, inside of the body of first level 208 and/or can be connected in some other means known in the art.

Figure 5:
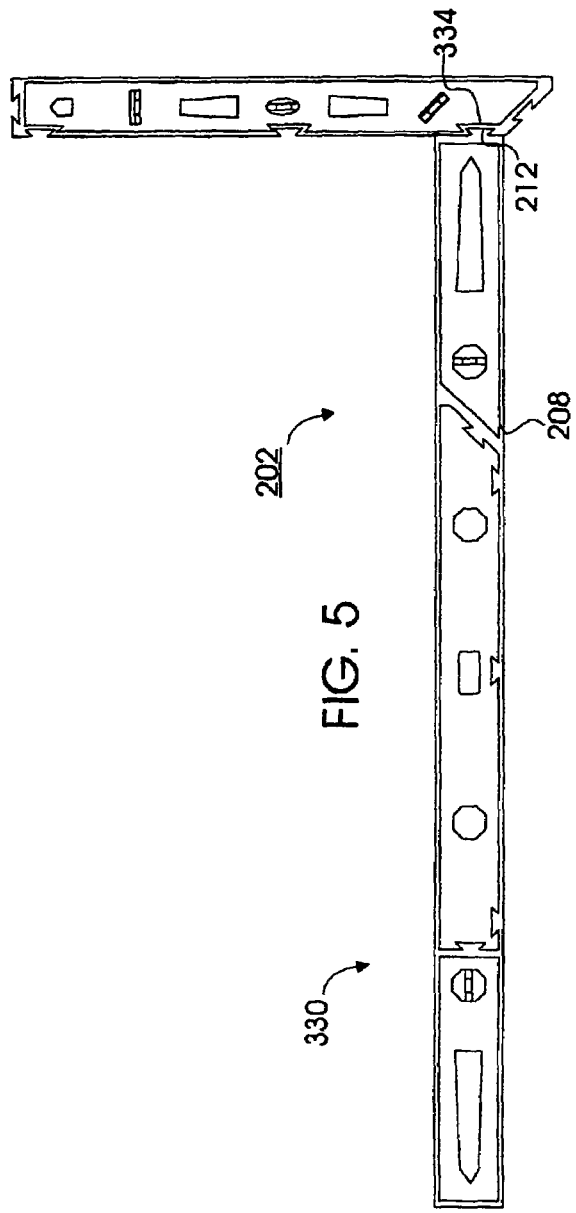
FIG. 5 is a top plan view of the first level and second level arranged as a carpenters square.

FIG. 5 shows first level 208 connected to second level 210 to create carpenter square 202 and this is also shown in FIG. 6. FIG. 7 shows first level 208 connected to second level 210 to form a 45° level 204.

FIG. 8 shows first level 208 connected to second level 210 to form a T-square 200.

A person skilled in the art will note that first level 208 can be interchangeably connected with second level 210 in numerous different fashions, some of which are depicted in FIGS. 1 through 8 to create various different geometries including T-square 200, carpenter square 202, 45° level 204, extra long level 206, and just a normal straight level as depicted in FIGS. 2, 3 and 4. The reader will note that there are three different combinations for a simple straight level, namely first level 208 and second level 210 nested together, second level 210 on its own, and finally, first level 208 on its own.

FIGS. 9, 10, 11 and 12 show an alternate embodiment of the present invention, a combination level and square 99 and all of the description above apply equally well to the second embodiment shown in 9, 10, 11 and 12. In particular FIGS. 9 and 12 show carpenter square 102, FIGS. 10 show T-square 100 and FIG. 11 shows second level nested within first level 104.

The drawings depict two examples of how the combination level and square could be put together. However a person skilled in the art will know that there are many different methods of attaching first level 208 to second level 210 and similarly first level 104 to second level 106 which may not be exactly as depicted in the drawings. In the present drawings the attachment elements are shown as dove tail connections.

In the nested position shown as 220 in FIG. 4 and shown as 120 in FIG. 11, the second level as nested within first level that the first and second level combination in the nesting position 120 or 220 can function as a simple straight normal level.

A person skilled in the art will further note that it is possible to have any number of angles between first level and second level other than those depicted here in the drawings which are given by way of example only.

By way of example only, first level 208 and second level 210 when connected end to end in similar fashion as shown in FIG. 7, could be disposed at other angles, for example the angles created by a 4-12, 5-12 or 6-12 pitched roof which are the most popular roof pitches used in North America.

In Use

First level 208 and second level 210 can be manipulated to be placed in a number of different positions, including a nested position 220 shown in FIG. 13, in which second level 210 is nested securely within first level 208. Long position 302 in which first level 208 is connected end to end with second level 210 as shown in FIG. 25 and FIG. 1. The attachment elements which include female dove tail 304 is connected to male dove tail 212 as shown in FIG. 25 and 26 and as shown in the long engaged position 306 in FIG. 27. In order to put first level 208 and second level 210 in long position 302, square end 310 of second level 210 having a female dove tail 304 is connected to male dove tail 212 being on one distal end of first level 208. The attachment elements including male and female dove tails in first and second levels slideably engage into the long position 302 creating extra long level 206 as shown in FIG. 1 and 25. There are numerous attachment elements generally depicted as male and female dovetail connections in the figures.

First level 208 and second level 210 can also be placed in an angled position 322 as shown in FIG. 28 as well as FIG. 7. Preferably on end of second level 210 includes an angled end 308 having an angled female dove tail connection 324 which cooperatively engages with the male dove tail 212 of first level 210 as best shown in FIGS. 30 and 29. The dove tails are connected to an angled engaged position 320 as shown in FIG. 29, wherein male dove tail 212 is slideably engaged with angled female dove tail 324. It will be apparent to those skilled in the art that angled position 322 can be any angle between 90 and 0 degrees and preferably as shown in FIG. 7 is a 45 degree angle which will produce 45 degree level 204.

First level 208 and second level 210 can be placed into the first square position 330 as shown in FIG. 31 as well as in FIG. 5. The square can also be placed in a second square position 331 as shown in FIG. 6. In the first square position 330, first square female dove tail 334 engages with male dove tail 212. In second square position 331, second square female dove tail 336 engages with male dove tail 212. In other words, either second square female dove tail 336 or first square female dove tail 334 can be used to engage with male dove tail 212, producing a carpenters square 202 as shown in FIG. 5 or FIG. 6.

First level 208 and second level 210 can also be placed into the T-square position 340 as shown in FIG. 33 as well as FIG. 8 and FIG. 10. In particular in T-square position 340 male dove tail 212 of first level 208 only engages half way into T-female dove tail 342 of second level 210. As best shown in FIG. 35 in the engaged position when T-female dove tail 342 is fully engaged with male dove tail 212, there is an offset 391 between first level 208 and second level 210 as is the case with any traditional T-square. Therefore, in the T-square position 340, the dove tails only engage approximately one half of the thickness of each of first level 208 and second level 210.

The reader will note that first level 208 has a cavity 400 for receiving second level 210 nested therein. First level 208 is a traditional rectangular straight carpenter level as is second level 208. The major difference between first level 208 and a traditional plastic injection moulded carpenter level, is that first level 208 includes cavity 400 for receiving second level 210 therein, as well as male dove tail 212 on one distal end thereof. First level 208 also includes vials 273 and of the type well known in the art.

Second level 210 is also a traditional rectangular straight type carpenter level with the exception that it includes female dove tail connections as well as optionally an angled end 308. Second level 210 is designed and adapted to be received within cavity 400 of first level 210. Second level 210 also includes traditional vials 273 which are the type well known in the art in the level industry. We refer to this type of level depicted in the drawings as a straight rectangular level which in most other aspects is similar to the traditional straight rectangular carpenter's level.

In the nested position 220, the exterior dimensions of first level 208 is unaltered in that second level 210 nests completely within first level 208, such that the top surfaces of second level 210 do not protrude above the top surface of first level 208. In other words, in the nested position the exterior dimensions of first level 208 remain unaltered. The exterior dimensions of first level 208 are the same in the nested position 220 as they are in the separate position 211. The exterior dimensions include the over length, width and thickness of the generally rectangular straight first level 208.

It should be apparent to persons skilled in the arts that various modifications and adaptation of this structure described above are possible without departure from the spirit of the invention the scope of which defined in the appended claim.

I claim
1. A combination level and square comprising:
a straight generally rectangular first level;
a straight second level having one angled straight end and one square end, wherein both levels having a levelling means, the angled straight end subtending an angle of between 15 and 75 degrees;
the first level having a cavity defined therein that is dimensioned and adapted to releasably receive the second level therein placing the levels in a nested position;
the first and second level having means for releasably attaching the first level to the second level selectively placing the levels in a long position, square position, and T-square position; and
the angled straight end having means for releasably attaching the first level to the second level at an angled position, the angled position subtending an obtuse angle between the first level and the second level.
2. The combination level square claimed in claim 1 wherein exterior dimensions of the first level are the same when the first and second levels are in the nested position as when the first and second levels are in a non-nested, separate position.
3. The combination level square claimed in claim 2 wherein the attaching means having attachment elements integrally part of each level for releasably connecting together the first and second levels selectively placing the levels in the long position, square position, T-square position, and angled position.
4. The combination level square claimed in claim 3 wherein the attachment elements having male and female cooperating dovetail connections for releasably connecting together the first and second levels selectively placing the levels in the long position, square position, T-square position, and angled position.
5. A combination level and square comprising:
a straight generally rectangular first level;
a straight second level, wherein both levels having a levelling means;
the first level having a cavity defined therein that is dimensioned and adapted to releasably receive the second level therein placing the levels in a nested position;
the first and second level having means for attaching the first level to the second level selectively placing the levels in a long position, square position, T-square position, and non-square angled position;
the second level having a square end for placing the levels in the long position and an angled straight end for attaching the first level to the second level and for placing the first level in the non-square angled position relative to the second level, the angled straight end subtending an angle of between 15 and 75 degrees.
6. The combination level and square claimed in claim 5 wherein the angled straight end is 45 degrees.
7. The combination level and square claimed in claim 6 wherein the attaching means having attachment elements integrally part of each level for connecting together the first and second levels selectively placing the levels in a long position, square position, T-square position and angled position.

8. The combination level and square claimed in claim 7 wherein the attachment elements having male and female cooperating dovetail connections for releasably connecting together the first and second levels selectively placing the levels in a long position, square position, T-square position, and angled position.

* * * * *